(12) United States Patent
Krishnan et al.

(10) Patent No.: US 12,401,570 B2
(45) Date of Patent: Aug. 26, 2025

(54) METHOD AND APPARATUS FOR TESTING AND VALIDATING AN OPEN RAN BASED FRONTHAUL SITE WITHOUT NETWORK CONNECTIVITY

(71) Applicant: Mavenir Systems, Inc., Richardson, TX (US)

(72) Inventors: Manoj Krishnan, Frisco, TX (US); Sarbeswar Mohapatra, Allen, TX (US); Sridhar Rajagopal, Plano, TX (US); Charles Santhosam Lourdu Raja, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 419 days.

(21) Appl. No.: 17/872,420

(22) Filed: Jul. 25, 2022

(65) Prior Publication Data

US 2023/0083011 A1    Mar. 16, 2023

(30) Foreign Application Priority Data

Aug. 5, 2021 (IN) .............................. 202121035428

(51) Int. Cl.
*H04W 24/00* (2009.01)
*H04B 17/318* (2015.01)
(Continued)

(52) U.S. Cl.
CPC ......... *H04L 41/145* (2013.01); *H04B 17/318* (2015.01); *H04L 41/147* (2013.01); *H04W 24/00* (2013.01)

(58) Field of Classification Search
CPC ... H04L 41/145; H04L 41/147; H04B 17/318; H04B 17/327; H04B 17/3912; H04W 24/00; H04W 24/06; H04W 88/085
(Continued)

(56) References Cited

U.S. PATENT DOCUMENTS 10,470,070 B1 * 11/2019 Ghaemi ................ H04W 24/10
11,569,942 B2 * 1/2023 Babaei .................. H04L 1/1896
(Continued)

OTHER PUBLICATIONS

Extended European Search Report for corresponding European patent application 22188106.3, 13 pages, dated Dec. 22, 2022.
(Continued)

*Primary Examiner* — Marceau Milord
(74) *Attorney, Agent, or Firm* — Ruggiero McAllister & McMahon LLC (57) ABSTRACT

A system is provided for at least one of testing and validating at least one Open Radio Access Network (O-RAN) remote radio head (RRH) present for installation at an installation site having no network connectivity to the RRH available, which system includes a network emulator configured to at least one of test and validate at least one of a device parameter and a functional parameter of the at least one RRH when selectively coupled to the at least one RRH. The network emulator is configured to be selectively coupled to a user equipment (UE) configured for displaying the at least one of the device parameter and the functional parameter of at least one RRH, and wherein the network emulator is one of 1) directly coupled to the at least one RRH, or 2) connected to the at least one RRH via a cell site router (CSR).

20 Claims, 8 Drawing Sheets

(51) Int. Cl.
*H04L 41/14* (2022.01)
*H04L 41/147* (2022.01)

(58) Field of Classification Search
USPC .......................................................... 455/423
See application file for complete search history.

(56) References Cited

U.S. PATENT DOCUMENTS

| | | | |
|---|---|---|---|
| 11,997,500 B2* | 5/2024 | Ashrafi | ............... H04L 41/0806 |
| 2013/0282334 A1* | 10/2013 | Diperna | .............. G06F 11/3433 |
| | | | 702/182 |
| 2018/0019899 A1* | 1/2018 | Kuchi | .................. H04B 7/0626 |
| 2018/0249346 A1* | 8/2018 | Plestid | .................. H04W 24/02 |
| 2019/0386753 A1 | 12/2019 | Martel et al. | |
| 2022/0353017 A1* | 11/2022 | Babaei | .................. H04L 1/1812 |

OTHER PUBLICATIONS

Viavi Solutions "Test Suite for O-RAN Specifications" Feb. 10, 2021; pp. 1-14; XP093007697, Retrieved from the Internet: URL:https://www.testunlimited.com/pdf/3ZTe lecom_3Z%20RF%20Vision_Datasheet.pdf.
ORAN Alliance "O-RAN.TIFG.E2ETSTFWK.0-v01.00: O-RAN Test and Integration Focus Group, End-to-End System Testing Framework Specification", Jul. 7, 2020; Retrieved from the Internet: URL:https://orandownloadsweb.azurewebsites.net/specifications.

* cited by examiner

| Field Name | Example | Notes |
|---|---|---|
| User Name: | Mavenir | up to 64 ASCII characters |
| User Key: | | up to 64 ASCII characters |
| Site ID: | LVS_226 | up to 32 ASCII characters |
| Date of Report: | 6/18/2021 | Date report generated a "Pass" status |
| Time of Report: | 09:00:00 PST | Time report generated a "Pass" status |
| GPS Location of CSR | 36:13.07 N / -115:12.72 W 0.662km | standard decimal lat/lon format |

| Field Name | Expected Data | Comment |
|---|---|---|
| RU Detected on CSR Port: | 4 | full string may be ~ Te0/0/4 |
| Alpha BXX RU MAC | 68:84:7e:fd:00:03 | should be standard MAC address format |
| Alpha BXX RU S/N | 3LFJC01022C | Up to 32 ASCII characters |
| Alpha BXX RU System Info | Software Version - 2003, Operating Band n71 | Provides RU details |
| Alpha BXX RU Active Alarms | No Alarms | Verify and clear alarms before proceeding |
| Alpha SFP RU light level | -2.88 | expect a negative number in -x.xx format |
| CSR Port SFP light level | -2.56 | expect a negative number in -x.xx format |
| Alpha Antenna SN | | Verify SN matches between photo and value pulled from RET query |
| Alpha BYYXX RET Operation | NA | Successfully adjust e-tilt to 10.0 and then back to 0 |
| Alpha BXX RU RSSI | | value in dBm |
| Alpha BXX VSWR | See the Note | should be a numerical x.xx format |
| Alpha BXX UE Test | PCI: 335, RSRP:-77, RSRQ: -11, SINR:31 | Verify all values are within spec |

METHOD AND APPARATUS FOR TESTING AND VALIDATING AN OPEN RAN BASED FRONTHAUL SITE WITHOUT NETWORK CONNECTIVITY

BACKGROUND OF THE DISCLOSURE

1. Field of the Disclosure

The present disclosure relates to a method and apparatus for Radio Access Networks (RANs), and relates more particularly to a method and apparatus for testing and validating an Open RAN (O-RAN)-based fronthaul site (e.g., a radio unit (RU) installation site) without network connectivity.

2. Description of the Related Art

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing, which make the conventional RANs difficult to upgrade and evolve. As future networks evolve to have massive densification of networks to support increased capacity requirements, there is a growing need to reduce the capital costs (CAPEX) and operating costs (OPEX) of RAN deployment and make the solution scalable and easy to upgrade.

Cloud-based Radio Access Networks (CRANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the Radio Unit (RU), sometimes referred to as Remote Radio Unit (RRU).

The O-RAN architecture is a Cloud-based architecture specified by the O-RAN Alliance. The components of the O-RAN architecture include, e.g., the Service Management and Orchestrator (SMO) Framework, the Non-Real Time (Near-RT) Radio Intelligent Controller (RIC), the Near-Real Time (Near-RT) Radio Intelligent Controller (MC), the O-RAN Centralized Unit (O-CU), the O-RAN Distributed Unit (O-DU), and the O-RAN Radio Unit (O-RU). The data between O-DU and O-RU is sent over the open fronthaul interface.

In the past, operators had all the elements of the RAN network deployed at the cell site, and hence many of the components needed for functional validation (e.g., of RUs) were available at the cell site. In the context of O-RAN where the RAN is disaggregated with several components remote, as network operators expand the networks with O-RAN-based fronthaul and commission sites, the sites may not have sufficient processing capacity (e.g., data transport and/or network connectivity). This necessitates the network operator to wait until sufficient data transport and/or network connectivity is available to perform the functional validation of commission sites, which means either i) a delay in initial installation until the data transport and/or network connectivity is available, or ii) requiring a second visit to the site after the initial installation to perform the functional validation. Both these options involve time and cost, which impact the scalability and growth for the operator and delay deployments. Therefore, there is a need for a solution which allows the operator to install and validate O-RAN-based RUs without having to wait for the data transport and/or network connectivity to be available.

SUMMARY OF THE DISCLOSURE

An example embodiment of the apparatus and method according to the present disclosure enables testing in-field radio units (RUs) after installation on top of the tower in the absence of data transport and/or network connectivity availability. The radio units can be mounted on a pole or on top of the tower, and the radio functionality can be tested after installation without requiring the RUs to be accessible by test instruments or requiring network connectivity to a data center. In the present disclosure, the terms radio, radio unit (RU) and remote radio head (RRH) will be used interchangeably.

An example method according to the present disclosure utilizes a commercial user equipment (UE), e.g., a mobile phone, a tablet, or a laptop computer, to validate transmissions by an O-RAN radio connected to an O-RAN network emulator.

An example method according to the present disclosure enables testing of O-RAN-based network in multiple deployment configurations, e.g., with and without a cell site router.

An example method according to the present disclosure enables checking radio alarms and connectivity aspects from the O-RAN fronthaul radio using the O-RAN network emulator.

An example method according to the present disclosure enables simultaneously checking all radios at a cell site with an O-RAN-based fronthaul radio and/or validating various bands and sector configurations.

An example method and apparatus according to the present disclosure enable checking and/or validating remote electrical tilt functionality and/or antenna serial numbers from the antenna using the O-RAN-based network emulator.

An example method according to the present disclosure provides networking functionality to the radio and/or the cell site router using Dynamic Host Configuration Protocol (DHCP) locally provided by the O-RAN-based network emulator.

An example method according to the present disclosure enables commercial UE connectivity by broadcasting (e.g., by the network emulator) the minimum system information (MSI) with system broadcast of Synchronization Signal Block (SSB) (e.g., including primary synchronization signal (PSS), secondary synchronization signal (SSS), and physical broadcast channel (PBCH)) and System Information Block 1 (SIB1) to enable the UE to detect signal quality and site parameters such as Physical Cell ID (PCI), Reference Signal Received Power (RSRP) and Reference Signal Received Quality (RSRQ) of the cell.

An example method according to the present disclosure enables validating uplink path in an O-RAN fronthaul radio installed at a site for signal sensitivity, timing offset and/or frequency offset by checking the Physical random access channel (PRACH) and detecting Received Signal Strength Indicator (RSSI), preamble and timing advance.

An example method according to the present disclosure enables monitoring the uplink (UL) channel and noise levels during site deployment for the intended UL spectrum prior to starting the operation, thereby enabling taking of appropriate actions against unauthorized users or heavy interference from adjacent sites or environmental noise levels, as well as aiding Frequency Selective Scheduling (FSS) in UL to avoid noise UL PRBs where needed.

An example method according to the present disclosure enables validation of a Multiple Radio Access Technology (Multi-RAT) or any single RAT Radio installations (e.g., 2G and/or 3G over enhanced Common Public Radio Interface (eCPRI), 4G and/or 5G) including and not limited to, e.g., CAT-A (e.g., Frequency Division Duplex (FDD), Time Division Duplex (TDD), and/or Millimeter Wave (mmWave)) and CAT-B (e.g., massive Multiple-Input Multiple-Output (mMIMO)) based sites.

An example embodiment of an apparatus for performing test and/or validation of a radio (RU) is configured as a network emulator, e.g., a portable O-RAN network emulator that is battery powered, where the network emulator can be operated by a technician with limited knowledge of the operation of the network.

The network emulator according to the present disclosure is useful even in the case of availability of data transport and/or the whole network, as the network emulator acts as the most simplified network to test the radio (RU) installation since the device under test (DUT) only includes a radio (RU). In contrast, for a validation involving the entire network in place, isolating a problem during testing to a particular node in the network, e.g., RU, DU or CU or element management system (EMS) configuration, is quite challenging.

In accordance with the present disclosure, the use of the network emulator allows the site installation/operation team to ensure that serial numbers and other inventory data uploaded to the element management system (EMS) are validated.

The use of the network emulator in accordance with the present disclosure can be applied to i) any O-RAN fronthaul (FH) based radio technologies such as 4G or 5G (and 2G/3G using eCPRI), ii) any categories of radios such as CAT-A or CAT-B, and iii) any frequency bands (e.g., TDD, FDD, in sub-6 GHz frequency, and/or mmWave frequencies).

According to an example embodiment of the present disclosure, the network emulator is configured to re-use distributed unit (DU) hardware of the O-RAN installed at cell site for testing the RRHs.

DETAILED DESCRIPTION

The example embodiment of the apparatus and method according to the present disclosure enables testing and validation of a radio (e.g., a remote radio head (RRH) and/or RU) and the associated connections at a commission site (e.g., O-RAN fronthaul (FH) site) having no data transport and/or network connectivity available. In accordance with the present disclosure, a network emulator is provided to test and/or validate a radio. An example embodiment of the network emulator can be used to confirm whether any damage occurred to an RRH, e.g., during shipment and or installation. While some testing on the radio would be done before shipment, it is still important to test the radio after it is deployed on a site to confirm full functionality and networking aspects, which obviates the need to redeploy a crew for the confirmation of the functionality when connectivity to a data center is established at a later date.

In accordance with an example method, a list of test cases (e.g., including site verification test cases and O-RAN test cases) is executed for verification, which can be implemented, for example, via a script running on an application given to a technician on-site. An advantage of this method of testing is the ability to avoid any tower climbing, which significantly reduces the time and cost associated with testing and/or validation.

An example embodiment of the network emulator includes software which works with a commercial UE (e.g., a mobile phone) to implement the testing and/or the validation. The network emulator software can also validate all installation and "plumbing" aspects, e.g., Remote Electrical Tilt (RET) cabling, RF cabling, cell site router connectivity, fiber, and power testing.

An example embodiment of the method for testing according to the present disclosure is compliant with O-RAN specifications and enables the verification of the radio configuration, software upgrades and bring-up process in a manner compliant with O-RAN specifications. Accordingly, the example embodiment of the method for testing and/or validation according to the present disclosure can be applied on an RRH without any additional specific requirement on the part of the RRH to support the testing and/or validation.

An example embodiment of the method for testing according to the present disclosure can check for alarms and events from the radio and the cell site router. Key performance indicators (KPIs) that can be tested include, e.g., Voltage Standing Wave Ratio (VSWR), Received Signal Strength Indicator (RSSI), Transmit (Tx) power, insertion loss, passive intermodulation (PIM) testing, plumbing. In addition, light levels on the fiber can be checked with the example embodiment of the method, e.g., a small form-factor pluggable (SFP) transceiver would report the light levels on the fiber, and the reported light levels can be examined on the radio and DU side.

The example method according to the present disclosure can be automated and the testing can be completed in a timely manner, e.g., less than 1 hour, whereby the installation work of a technician or a general contractor can be validated. All sectors at a site and all radios within a sector can be validated in parallel by enabling simultaneous transmissions, i.e., testing can be done in parallel for all sectors and bands at the site, and there is no need for a person to be physically present at the site during the testing. A commercial UE can be used with a drive test in various locations around the site to check the transmissions and validate the radio installation.

Each sector broadcasts a different cell ID, i.e., Physical Cell ID (PCI), and this can be used to validate whether the direction of transmission is in conformance with the direction planned for the radio as per PCI. Thus, all sector connections, e.g., alpha, beta, and gamma, as well as their directions can be validated.

An example embodiment of the method according to the present disclosure enables Remote Electrical Tilt (RET) testing via O-RAN interface so that the antennas and electrical tilt mechanisms can be validated at the top of the tower as well. RET motors may be dependent on serial numbers of the radio in order to prevent tilting the wrong sectors. The example embodiment of the method according to the present disclosure enables i) mapping RET IDs with antenna IDs, and ii) confirming the mapping using EMS. For this purpose, antenna vendor database can be accessed to obtain a list of RET IDs and antenna IDs. There can be multiple antennas, and multiple RUs per sector, each with its own RET.

In most cell site deployments, there is usually a convenience outlet and a cabinet/platform at the bottom of a tower that can be used to connect the network emulator according to the present disclosure for testing, thereby eliminating the time a technician has to spend on top of the tower to validate the radios and connections.

The network emulator according to the present disclosure ensures that the inventory and actual mounting of RUs can be verified based on serial numbers obtained using the network emulator.

In O-RAN mode, all FH traffic is packetized and sent over Ethernet interface by the application implemented in the network emulator. For timing synchronization, an example embodiment of the network emulator (which functions as a DU emulator for the fronthaul validation, and hence the terms "network emulator" and "DU emulator" will be used interchangeably in the present disclosure) and RU will be connected to Grandmaster (GM) clock with precision time protocol (PTP)-aware switch (lls-C3 configuration as per O-RAN). Alternatively, the network emulator can have a network interface card (NIC) with built-in GPS receiver or takes in 1 pulse per second (1PPS) to become a PTP/Synchronous Ethernet (SyncE) GM by itself (lls-C1 configuration as per O-RAN).

The network emulator transmits the 3GPP-compliant broadcast information continuously, including the system information broadcast signals (SIB) with the appropriate network configuration that is being expected by a commercial UE (e.g., a mobile phone), which broadcast information is detected and used by the commercial UE to validate parameters such as the cell ID and derive parameters such as signal strength which gives an indication of the quality of the transmission as well as the transmit power of the radio. In addition, the network emulator captures alarms and issues (e.g., connectivity) reported by the radio during its transmission, enabling the technician to make further adjustments without requiring a return to the site for additional validation and tower climbs, thereby reducing the cost of the deployment.

Figure 1:
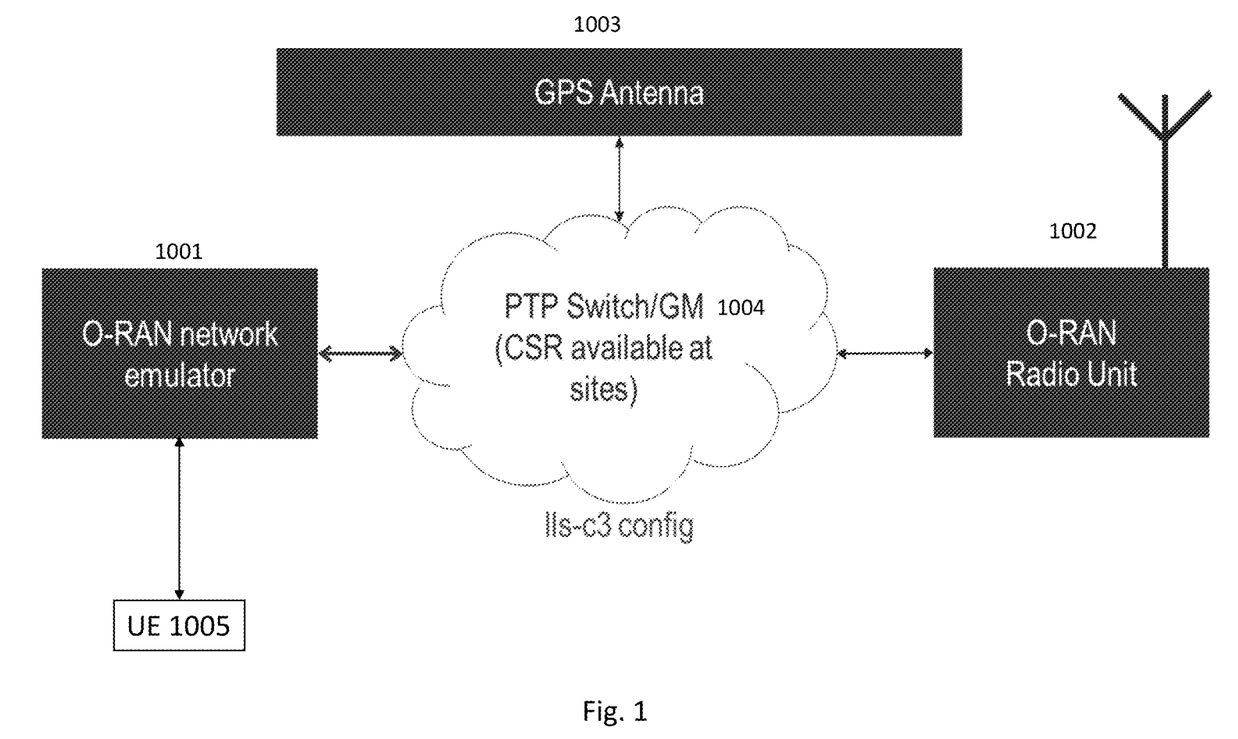
FIG. 1 shows an example embodiment of an O-RAN network emulator deployed for testing an O-RAN radio unit.

FIG. 1 shows an example embodiment of an O-RAN network emulator 1001 deployed for testing an O-RAN radio unit (RU) 1002. In this example case, it is assumed that a cell site router (CSR) 1004 is available at the site, and the network emulator 1001 is connected to the RU 1002 via the cell site router 1004 serving as a PTP switch/GM. A GPS antenna 1003 is assumed to be available at the site to provide timing. The network timing distribution, e.g., the timing to the network emulator 1001 and the RU 1002, is provided by the implementation of O-RAN-specified lls-c3 configuration for O-RAN fronthaul synchronization shown in FIG. 1, which lls-c3 configuration in O-RAN is implemented by the cell site router 1004 serving as the PTP switch/GM. The network emulator 1001 provides a completely open and O-RAN-compliant interface to the RU 1002 and the PTP switch/GM and can validate the control plane, the data plane, the management plane, and timing to the radio (RU 1002). In addition, the network emulator 1001 can analyze issues with the plumbing and validate faults and alarms at the radio (RU 1002) when it is installed on the tower. The network emulator 1001 (which in this example functions as an O-RAN network emulator) provides Dynamic Host Configuration Protocol (DHCP) functionality to provision server and assign IP addresses to connect to the radio (RU 1002) for testing. After the testing completed, the network emulator 1001 resets the cell site router (CSR) to the original state.

Figure 2:
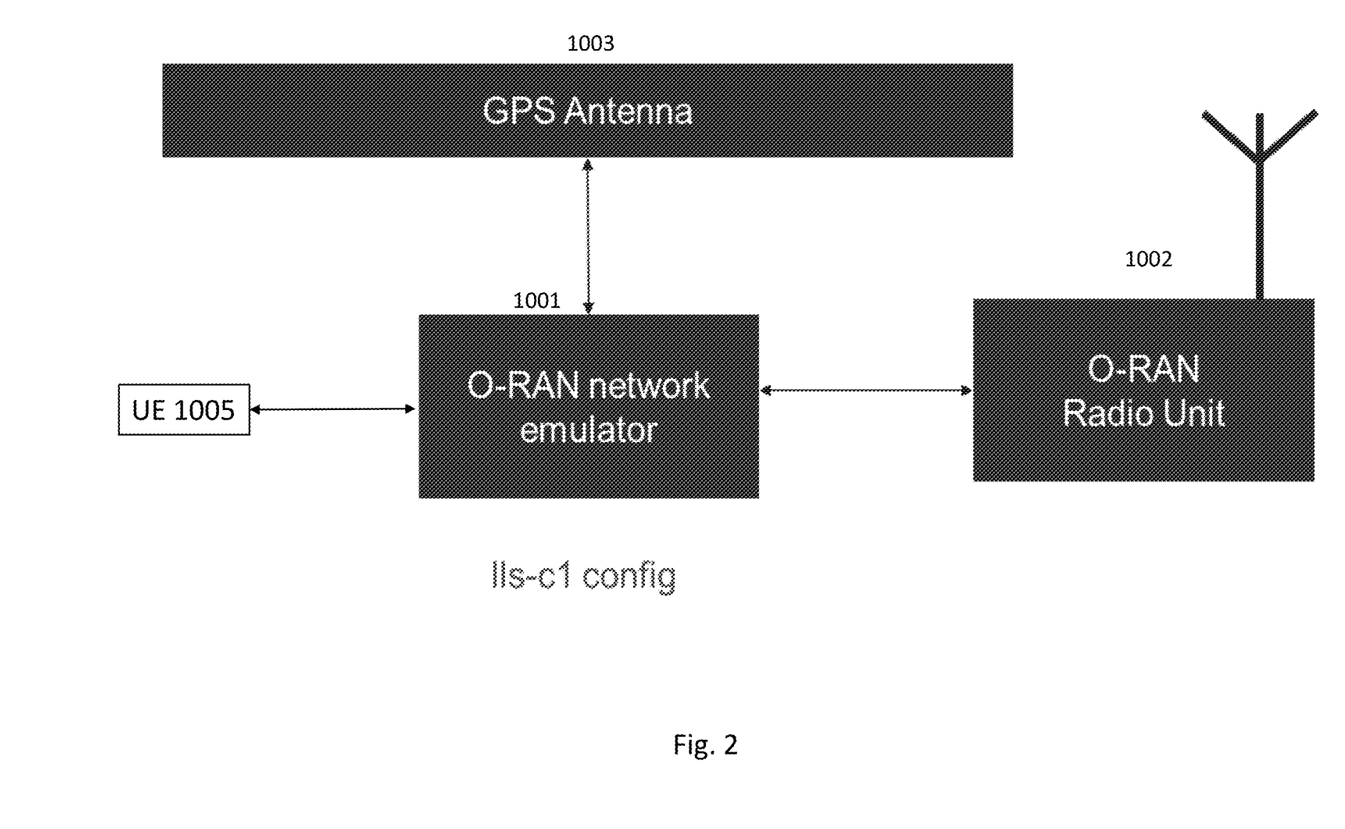
FIG. 2 shows an example embodiment of O-RAN network emulator connected directly to the RU for testing and validation.

FIG. 2 shows an example embodiment of O-RAN network emulator 1001 connected directly to the RU 1002 for testing and validation. In this example embodiment, it is assumed that there is a network card available for the network emulator 1001 that can provide timing and has sufficient ports to connect to the RU 1002 directly for testing. In addition, in this example embodiment, the GPS is also supported by the O-RAN network emulator 1001 (i.e., as shown in FIG. 2, the O-RAN network emulator 1001 is directly connected to the GPS antenna 1003). The example embodiment of the connection of the O-RAN network emulator 1001 shown in FIG. 2 for testing and validation is fully compliant with O-RAN-specified lls-c1 configuration for O-RAN fronthaul synchronization.

Figure 3:
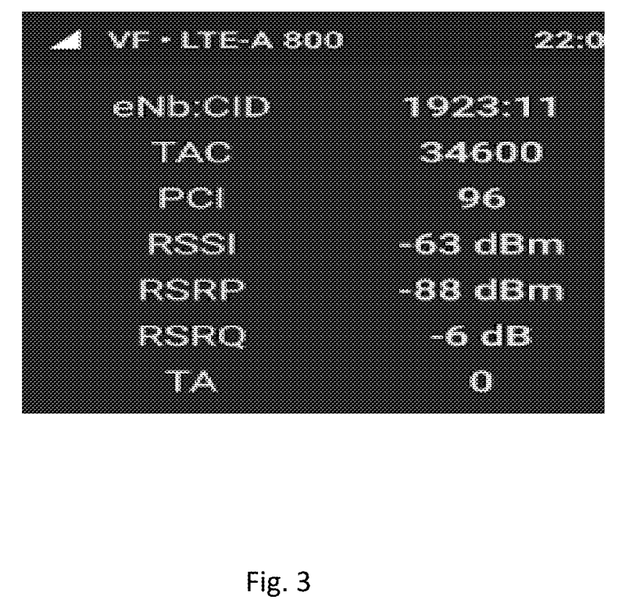
FIG. 3 illustrates example parameters that are displayed on the UE during testing.

FIG. 3 illustrates example parameters that are displayed on the UE (e.g., mobile device) during testing. Among the displayed parameters, selected parameters, e.g., RSSI, RSRP, timing advance (TA), and PCI, are compared with expected values at the location of the testing to determine whether the displayed values are consistent with the expected values, or whether further validation/checking is required. For example, if the cell is not detected, it can be assumed that there is something wrong with the radio configuration which should be investigated further.

Figure 4:
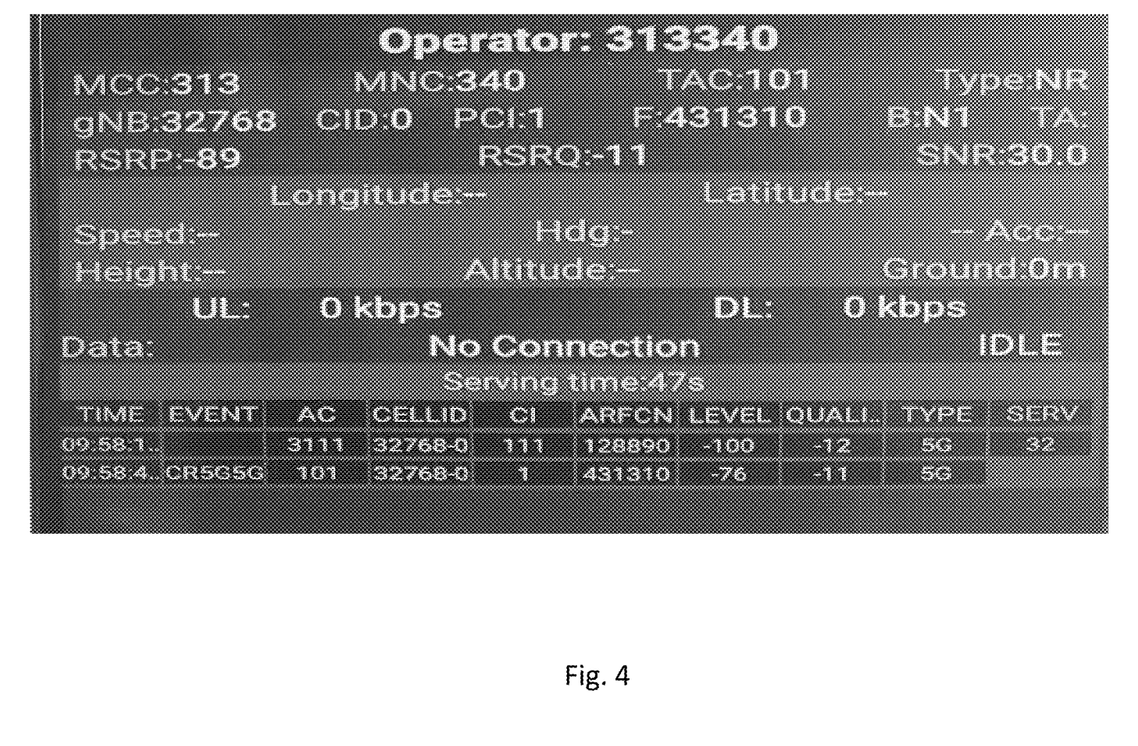
FIG. 4 illustrates another set of example parameters that are displayed on the UE during testing.

FIG. 4 illustrates another set of example parameters that are displayed on the UE during testing. Among the displayed parameters, selected parameters, e.g., Mobile Country Code (MCC), Mobile Network Code (MNC), Absolute Radio Frequency Channel Number (ARFCN), DL/UL data (if any), etc., can be validated by comparing to expected values.

In addition to the radio testing, the antenna testing for remote electrical tilt (RET) can also be implemented using the network emulator and the disclosed methods in accordance with the present disclosure. The network emulator can, e.g., i) return the serial number of the antenna and compare it to a database of antennas to validate, and ii) sweep the RET in a range, e.g., 0 to 10 degrees, and report any errors.

Figure 5:
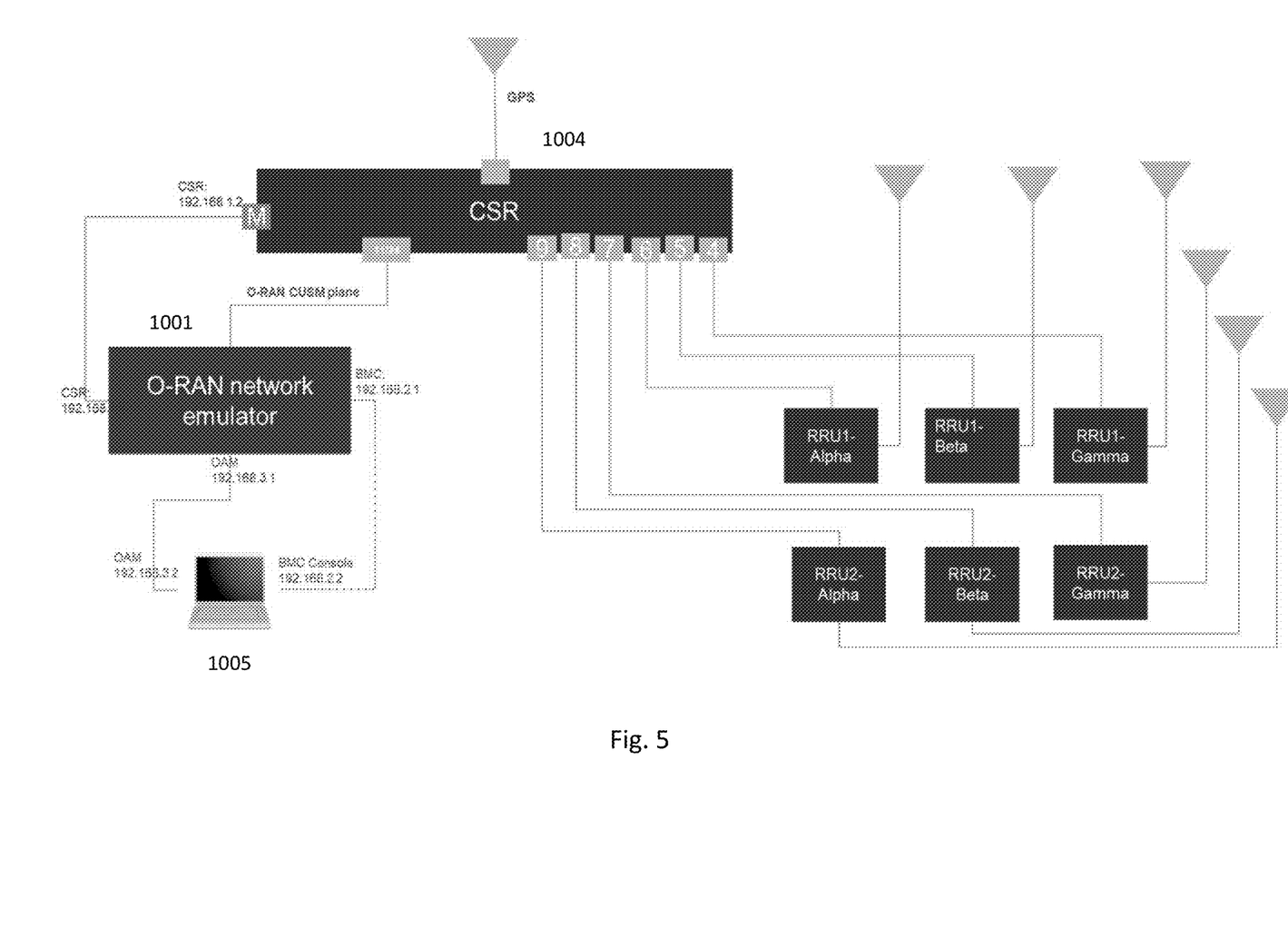
FIG. 5 shows an example physical implementation of the O-RAN network emulator.

FIG. 5 shows an example physical implementation of the O-RAN network emulator 1001 in the lls-c3 configuration, connected with the CSR 1004, which is in turn connected to various radios at the site (e.g., RRU1-Alpha, RRU2-Beta, etc.). The O-RAN network emulator 1001 is also connected to a UE (e.g., a laptop). The network emulator 1001 i) can be implemented on a general-purpose hardware and ii) can be supported independently or integrated within a laptop to make the network emulator portable and easy to use. All the radios at the site can be enabled and tested in parallel, reducing the time need to test and validate any issues related to interference or cross-talk between the radios or power issues at the site to drive all the radios in parallel.

In an example embodiment according to the present disclosure, the parameters for the subscriber identity module (SIM) card used by the UE (e.g., mobile device) in connection with the testing are exchanged with the operator, which SIM card parameters can include: MCC; MNC; Public Land Mobile Network (PLMN) ID; and Authentication Keys and algorithms.

Figure 6:
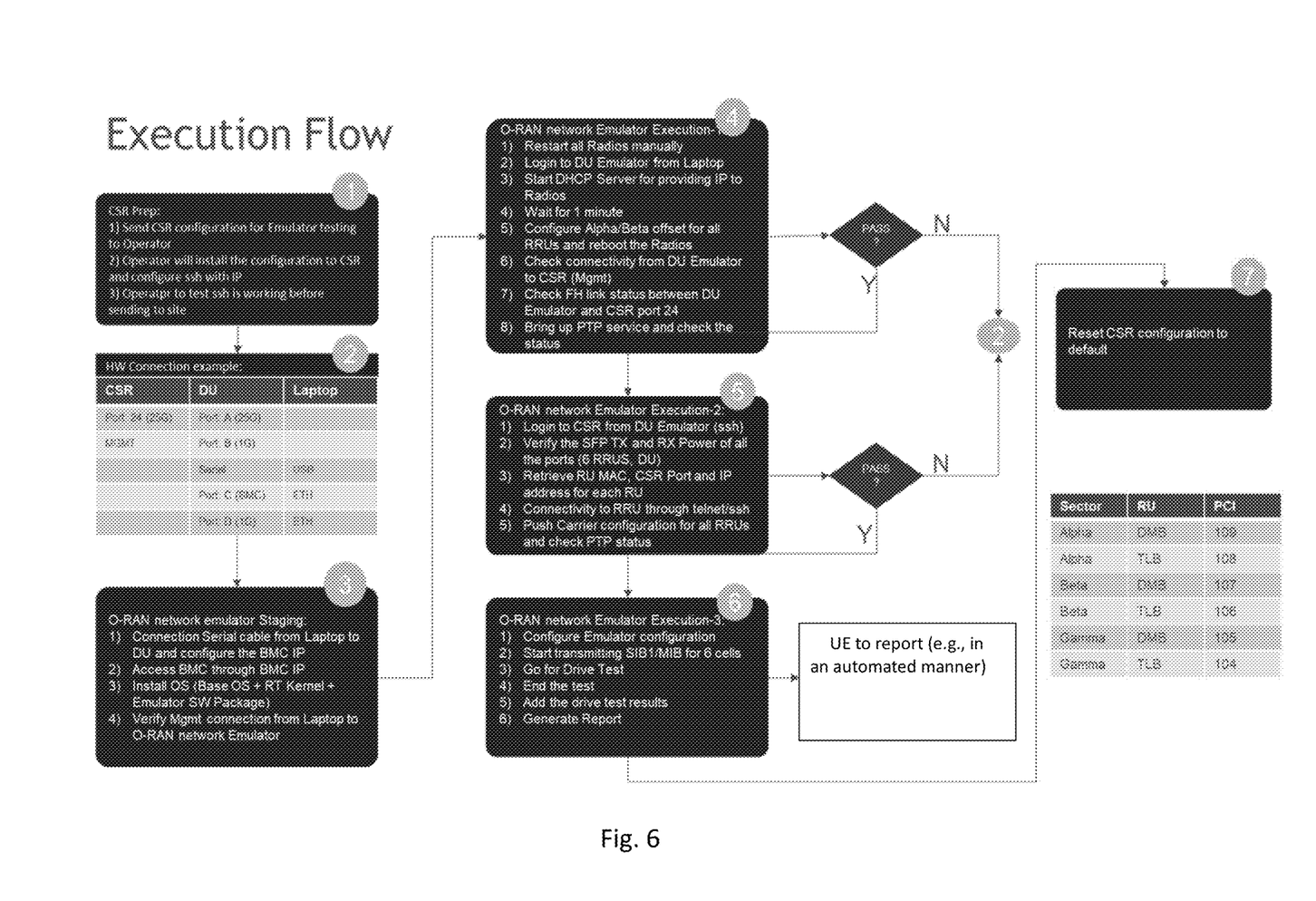
FIG. 6 shows an example sequence of steps implemented in a method for testing/validating using the O-RAN network emulator.

FIG. 6 shows an example sequence of steps implemented in a method for testing/validating using the O-RAN network emulator in lls-c3 configuration. Similar flow can be implemented for lls-c1 configuration. As shown in FIG. 6, there are seven steps (enumerated by numbers 1-7 in circles), which are discussed in detail below.

STEP 1 involves preparation of the CSR (e.g., to provide the ability to connect to it). STEP 1 can include the following parts: i) send CSR configuration for emulator-implemented testing to the network operator; ii) network operator installs the configuration to the CSR and configure secure shell (ssh) with Internet Protocol (IP); and iii) network operator tests to confirm ssh is working before sending it to the commission site.

STEP 2 involves completing the connectivity (connecting components/ports shown laterally in the same row) among the CSR, the O-RAN network emulator (acting as DU) and a laptop. It should be noted that the network emulator (which is interchangeably designated as "DU" in FIG. 6) may be implemented in software as part of the laptop.

STEP 3 involves staging the network emulator. This can be an OPTIONAL step depending on how the hardware is configured. The O-RAN network emulator can use the hardware on site to reduce the footprint of the emulator. In this case, the staging is needed to use the hardware available on site. Parts of STEP 3 can include: i) connect serial cable from the laptop to DU and configure the baseboard management controller (BMC) IP; ii) access the BMC through the BMC IP; iii) install the operating system (OS) (which can include a base OS, real time (RT) kernel, and emulator software (SW) package); and iv) verify the management connection from the laptop to O-RAN network emulator.

STEP 4 involves establishing connectivity to the cell site router (CSR) and to the radio (RRU). The PTP service is brought up and validated as part of this test. If this test fails, the testing method sequence returns to STEP 2 to check the connectivity. Parts of STEP 4 can include: i) restart all radios manually; ii) log-in to DU emulator from the laptop; iii) start the DHCP server for providing IP to the radios; iv) wait for a certain time duration e.g. 1 minute; v) configure Alpha/Beta offset for all RRUs and reboot the radios; vi) check connectivity from the DU emulator to the CSR; vii) check FH link status between the DU emulator and CSR port e.g. port 24; and viii) bring up PTP service and check the status.

STEP 5 involves checking the radio and switch for alarms and pushing the carrier configuration to the radios. Parts of STEP 5 can include: i) log-in to CSR from the DU emulator; ii) verify the SFP transmit (TX) and receive (RX) power of all the ports (e.g., 6 RRUs, DU); iii) retrieve RU media access control (MAC), CSR port and IP address for each RU; iv) achieve connectivity to RRU through telnet/ssh; and v) push carrier configuration for all RRUs and check PTP status. If this test fails, the testing method sequence returns to STEP 2 to check the connectivity.

STEP 6 involves configuration of the radio and start transmitting the reference signals. The UE is then taken on a drive test in the site to check the radio and observe any anomalies, followed by generation of a report based on the testing. Parts of STEP 6 can include: i) configure DU emulator configuration; ii) start transmitting SIB1/master information block (MIB) for, e.g., 6 cells; iii) go for drive test; iv) end the test; v) add the drive test results; and vi) generate the report of the test results. As noted in FIG. 6, the UE can provide the report, e.g., in an automated manner.

STEP 7 in FIG. 6 involves resetting the CSR configuration to the default setting to leave it in the same state before this test.

Figure 7:
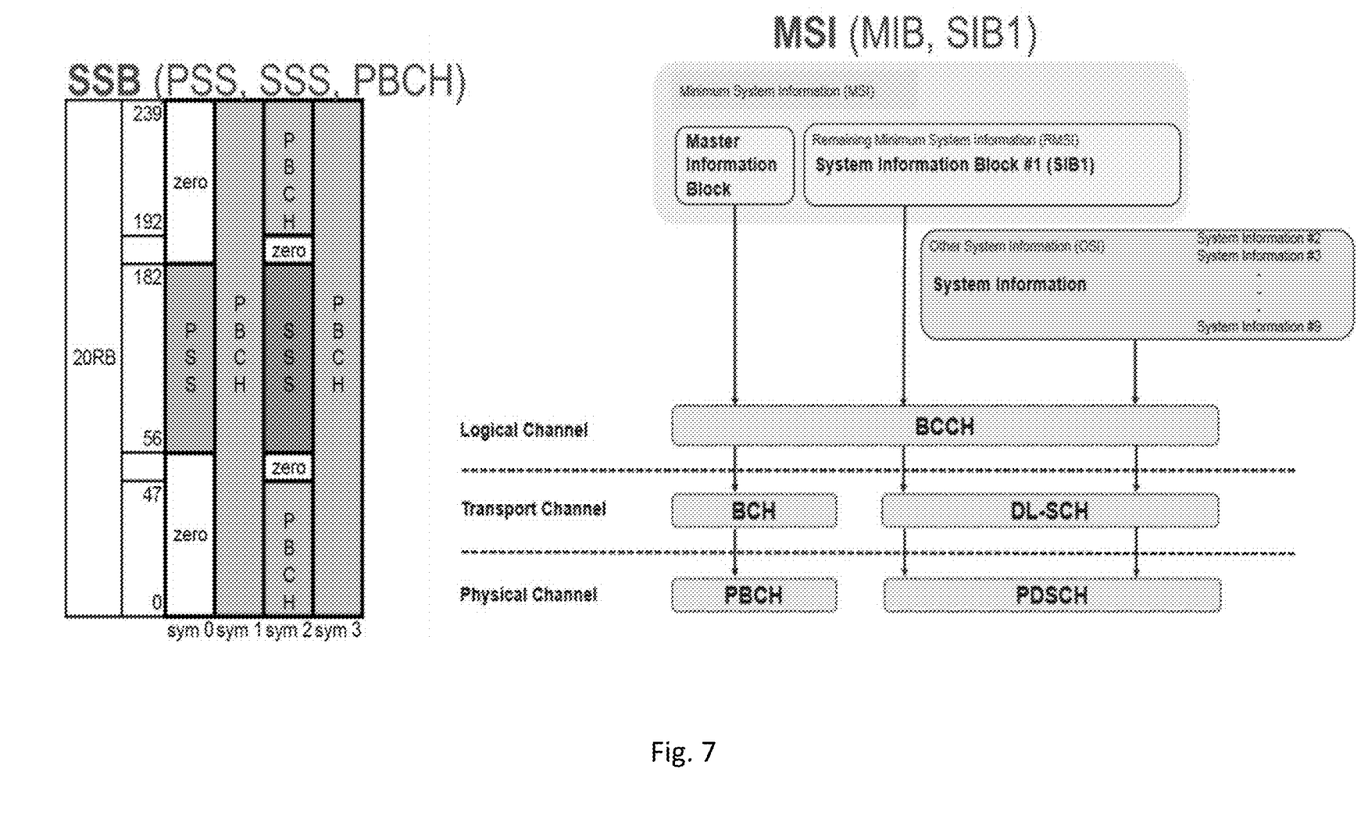
FIG. 7 shows the transmission of the SSB, which includes the PSS, SSS and PBCH.

FIG. 7 shows the transmission (e.g., by the network emulator) of the SSB, which includes the PSS, SSS and PBCH. In addition to the SSB, the minimum system information (MIB and SIB1) is also broadcast. The transmission of all these signals enables the UE (mobile device) to decode the cell parameters and calculate the reference signal quality. Also shown in FIG. 7 are: Broadcast Control Channel (BCCH); Broadcast Channel (BCH); Downlink Shared Channel (DL-SCH); Physical Broadcast Channel (PBCH); Physical Data Shared Channel (PDSCH).

Figure 8:
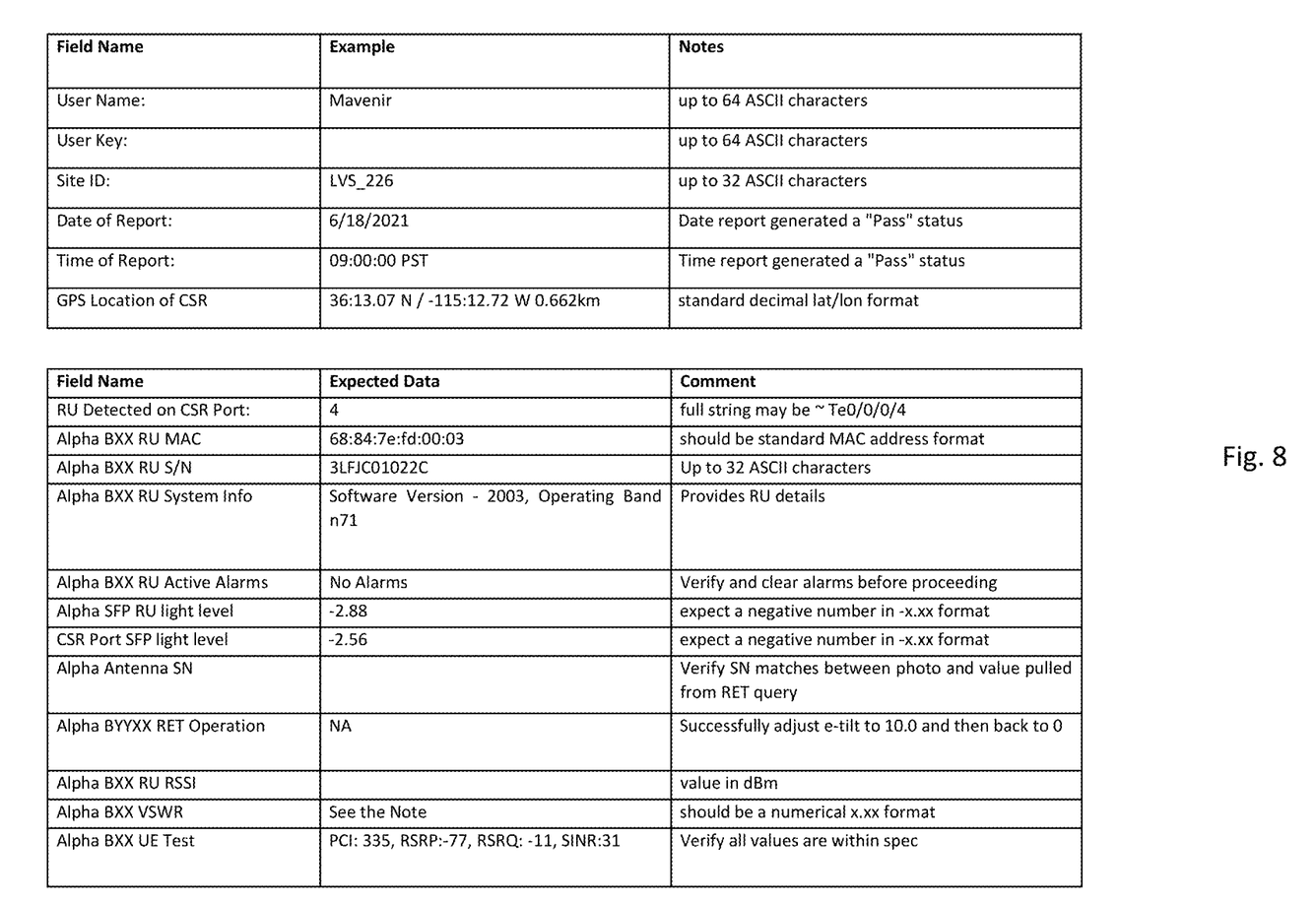
FIG. 8 shows an example test report generated using the network emulator and the example method in accordance with the present disclosure.

Using the example embodiment of the network emulator and the testing method according to the present disclosure, both the DL and UL paths of the radio can be validated. As an example, for the UL validation, the following can be implemented:

1) After latching on the cell, UE initiates a Preamble transmission on a Random Access Channel (RACH) opportunity.
2) The O-RAN network emulator receives the Physical Random Access Channel (PRACH) samples and triggers preamble detection routines.
3) RSSI, Preamble detection and timing advance value can be used to confirm uplink reception on 6 resource blocks (RBs).
4) Frequency offset parameters can be varied to cover the larger uplink bands (e.g., 6 RB at a time).
5) RU's Rx KPIs such as RSSI can additionally be verified FIG. 8 shows an example test report generated using the network emulator and the example method in accordance with the present disclosure.

Definitions

3GPP: 3rd Generation Partnership Project
BS: Base Station
CSR: Cell Site Router
CUS-plane: Control, user, and synchronization plane
DL: Downlink
eCPRI: Enhanced Common Public Radio Interface
eNB: eNodeB (4G LTE base station)
FH: Fronthaul
FS: Functional split
gNB: gNodeB (5G NR base station)
GPS: Global positioning system
HW: Hardware
M-plane: Management plane
O-CU: O-RAN compliant Centralized Unit
O-DU: O-RAN compliant Distributed Unit
O-RU: O-RAN compliant Radio Unit
PRACH: Physical random access channel
PRB: Physical resource block
PTP: Precision time protocol
RACH: Random access channel
RAT: Radio access technology
RE: Resource element
RET: Remote Electrical Tilt RoE: Radio over Ethernet
SW: Software
SyncE: Synchronous Ethernet
UE: User Equipment
UL: Uplink

What is claimed:

1. A system for at least one of testing and validating at least one Open Radio Access Network (O-RAN) remote radio head (RRH) present for installation at an installation site having no network connectivity to the RRH available, comprising:
   a network emulator configured to at least one of test and validate at least one of a device parameter and a functional parameter of the at least one RRH when selectively coupled to the at least one RRH, wherein the at least one RRH has no network connectivity;
   wherein the network emulator is configured to be selectively coupled to a user equipment (UE) configured for displaying at least one of the device parameter and the functional parameter of at least one RRH for the at least one of testing and validating, and wherein the network emulator is one of 1) directly coupled to at least one RRH for the at least one of testing and validating, or 2) connected to the at least one RRH via a cell site router (CSR) for the at least one of testing and validating.

2. The system according to claim 1, wherein the network emulator is configured to re-use distributed unit (DU) hardware of the O-RAN installed at cell site for testing the at least one RRH.

3. The system according to claim 1, wherein the UE is one of a mobile phone, a tablet, or a laptop computer.

4. The system according to claim 1, wherein the network emulator is configured to check for at least one of an alarm and a connectivity issue reported by the at least one RRH.

5. The system according to claim 1, wherein multiple RRHs are present at the installation site, and wherein the network emulator is configured to at least one of test and validate at least one of the device parameter and the functional parameter of the multiple RRHs simultaneously.

6. The system according to claim 5, wherein the network emulator is configured to at least one of test and validate at least one of a frequency band and a sector configuration.

7. The system according to claim 1, wherein the network emulator is configured to at least one of test and validate at least one of remote electrical tilt (RET) functionality and antenna serial number of an antenna associated with the at least one RRH.

8. The system according to claim 1, wherein the network emulator is configured to at least one of:
   i) provide Dynamic Host Configuration Protocol (DHCP) functionality to provide networking functionality to at least one of a) the at least one RRH and b) the CSR; and
   ii) broadcast minimum system information (MSI) including at least one of Synchronization Signal Block (SSB) and System Information Block 1 (SIB1) to enable the UE to detect signal quality and site parameters associated with the at least one RRH, wherein the site parameters include at least one of Physical Cell ID (PCI), Reference Signal Received Power (RSRP) and Reference Signal Received Quality (RSRQ) of a cell associated with the at least one RRH.

9. The system according to claim 1, wherein the network emulator is configured to at least one of:
   i) validate at least one of signal sensitivity, timing offset, and frequency offset of an uplink (UL) channel from the at least one RRH in an O-RAN fronthaul by checking at least one of Physical Random Access Channel (PRACH), Received Signal Strength Indicator (RSSI), preamble and timing advance; and
   ii) study the noise level of a selected spectrum for the UL channel prior to starting operation of the at least one RRH.

10. The system according to claim 1, wherein the network emulator is configured to validate at least one of a Multiple Radio Access Technology (Multi-RAT) RRH installation and a single-RAT RRH installation.

11. A method for at least one of testing and validating at least one Open Radio Access Network (O-RAN) remote radio head (RRH) present for installation at an installation site having no network connectivity to the RRH available, comprising:
   at least one of testing and validating, using a network emulator, at least one of a device parameter and a functional parameter of the at least one RRH when the network emulator is selectively coupled to the at least one RRH and a user equipment (UE), wherein the at least one RRH has no network connectivity;
   wherein the UE displays the at least one of the device parameter and the functional parameter of at least one RRH for the at least one of testing and validating, and wherein the network emulator is one of 1) directly coupled to the at least one RRH for the at least one of testing and validating, or 2) connected to the at least one RRH via a cell site router (CSR) for the at least one of testing and validating.

12. The method according to claim 11, wherein the network emulator re-uses distributed unit (DU) hardware of the O-RAN installed at cell site for testing the at least one RRH.

13. The method according to claim 11, wherein the UE is one of a mobile phone, a tablet, or a laptop computer.

14. The method according to claim 11, wherein the network emulator checks for at least one of an alarm and a connectivity issue reported by the at least one RRH.

15. The method according to claim 11, wherein multiple RRHs are present at the installation site, and wherein the network emulator at least one of tests and validates at least one of the device parameter and the functional parameter of the multiple RRHs simultaneously.

16. The method according to claim 15, wherein the network emulator at least one of tests and validates at least one of a frequency band and a sector configuration.

17. The method according to claim 11, wherein the network emulator at least one of tests and validates at least one of remote electrical tilt (RET) functionality and antenna serial number of an antenna associated with the at least one RRH.

18. The method according to claim 11, wherein the network emulator at least one of:
   i) provides Dynamic Host Configuration Protocol (DHCP) functionality to provide networking functionality to at least one of a) the at least one RRH and b) the CSR; and
   ii) broadcasts minimum system information (MSI) including at least one of Synchronization Signal Block (SSB) and System Information Block 1 (SIB1) to enable the UE to detect signal quality and site parameters associated with the at least one RRH, wherein the site parameters include at least one of Physical Cell ID (PCI), Reference Signal Received Power (RSRP) and Reference Signal Received Quality (RSRQ) of a cell associated with the at least one RRH.

19. The method according to claim 11, wherein the network emulator at least one of:

i) validates at least one of signal sensitivity, timing offset, and frequency offset of an uplink (UL) channel from the at least one RRH in an O-RAN fronthaul by checking at least one of Physical Random Access Channel (PRACH), Received Signal Strength Indicator (RSSI), preamble and timing advance; and ii) studies the noise level of a selected spectrum for the UL channel prior to starting operation of the at least one RRH.

20. The method according to claim 11, wherein the network emulator validates at least one of a Multiple Radio Access Technology (Multi-RAT) RRH installation and a single-RAT RRH installation.

* * * * *